(12) United States Patent
Tobita et al.

(10) Patent No.: US 7,784,267 B2
(45) Date of Patent: Aug. 31, 2010

(54) DETONATION ENGINE AND FLYING OBJECT PROVIDED THEREWITH

(75) Inventors: Akihiro Tobita, Aichi-ken (JP);
Toshitaka Fujiwara, 207-B105,
Heiwagaoka 5-chome, Meito-ku,
Nagoya, Aichi-ken (JP) 465-0097; Piotr Wolanski, Department of Mechanical Engineering, Warsaw University of Technology Pl. Politechniki 1, Warsaw 00-661 (PL)

(73) Assignees: Mitsubishi Heavy Industries, Ltd., Tokyo (JP); Toshitaka Fujiwara, Nagoya (JP); Piotr Wolanski, Warsaw (PL)

( * ) Notice: Subject to any disclaimer, the term of this patent is extended or adjusted under 35 U.S.C. 154(b) by 1188 days.

(21) Appl. No.: 11/143,495

(22) Filed: Jun. 3, 2005

(65) Prior Publication Data
US 2005/0284127 A1 Dec. 29, 2005

(30) Foreign Application Priority Data
Jun. 29, 2004 (JP) .............................. 2004-191793

(51) Int. Cl.
*F02K 5/02* (2006.01)
*F02C 5/02* (2006.01)
(52) U.S. Cl. ....................................... 60/247; 60/39.38
(58) Field of Classification Search ................... 60/247, 60/39.38, 39.76
See application file for complete search history.

(56) References Cited

U.S. PATENT DOCUMENTS 2,748,564 A * 6/1956 Marchal et al. ............... 60/248
3,727,409 A 4/1973 Kelley et al.
4,689,950 A * 9/1987 Minardi et al. ............... 60/204

(Continued)

FOREIGN PATENT DOCUMENTS

EP    1 455 065 A2    9/2004

(Continued)

OTHER PUBLICATIONS

Takayuki Kojima, "Conceptual Study on Application of PDE to Hypersonic Propulsion System", the proceedings of Symposium on Shock Waves, 2003 Japan, pp. 113-116, with English abstract.

*Primary Examiner*—William H Rodríguez
*Assistant Examiner*—Gerald L Sung
(74) *Attorney, Agent, or Firm*—Wenderoth, Lind & Ponack, L.L.P.

(57) ABSTRACT

A detonation engine which creates thrust by generating a detonation wave, wherein the overall engine structure is simplified, and continuous output can be obtained, comprises: a rotational flow generation device which generates rotational flow about an axis in a mixed gas of air and fuel or of oxygen and fuel; a detonation chamber arranged downstream from the rotational flow generation device, formed in a ring-shape radially extended and continuous in the circumferential direction, which continuously combusts in the circumferential direction the mixed gas in which the rotational flow is generated to generate detonation waves, and draws it in from the radial inside and exhausts it to the radial outside; and a nozzle which is connected to the detonation chamber, and jets the high temperature and pressure combustion gas generated by the detonation waves flowing from the detonation chamber, to the rear while expanding it, and converts it into thrust.

5 Claims, 5 Drawing Sheets

U.S. PATENT DOCUMENTS

| | | | |
|---|---|---|---|
| 4,719,746 A | | 1/1988 | Keller |
| 4,756,154 A | * | 7/1988 | Minardi et al. ................ 60/269 |
| 6,442,930 B1 | * | 9/2002 | Johnson et al. ............ 60/226.1 |
| 2004/0172950 A1 | | 9/2004 | Venkataramani et al. |
| 2004/0261396 A1 | * | 12/2004 | Sammann et al. .......... 60/226.1 |

FOREIGN PATENT DOCUMENTS

| | | |
|---|---|---|
| JP | 62-29727 | 2/1987 |
| JP | 2-130249 | 5/1990 |
| JP | 7-247906 | 9/1995 |
| JP | 10-68355 | 3/1998 |
| JP | 2001-355515 | 12/2001 |
| WO | 03/089773 | 10/2003 |

* cited by examiner

DETONATION ENGINE AND FLYING OBJECT PROVIDED THEREWITH

BACKGROUND OF THE INVENTION

1. Field of the Invention

The present invention relates to a detonation engine which utilizes the detonation phenomenon accompanying a normal shock wave at the front of a combustion wave.

2. Description of Related Art

As a detonation engine which utilizes the detonation phenomenon, there is known a pulse detonation engine comprising an outlet valve at the exit of the combustion tube (for example, refer to Takayuki Kojima, "Conceptual Study on Application of PDE to Hypersonic Propulsion system", the proceedings of Symposium on Shock Waves, 2003 Japan, p. 113 to 116 (hereunder, "Document 1")), and a combined cycle pulse detonation turbine engine comprising a plurality of shock tubes (for example, refer to Japanese Unexamined Patent Application, First Publication No. 2001-355515 (FIG. 1 and FIG. 2) (hereunder, "Document 2")).

However, in the pulse detonation engine disclosed in Document 1 there is a problem in that: when the outlet valve is closed, the closed valve becomes resistive; the overall engine structure becomes complicated due to providing such an outlet valve; and exhaust due to fuel replenishment, combustion, and expansion waves is performed repeatedly at a cycle of about 10 Hz to 100 Hz, and hence continuous output cannot be obtained.

On the other hand, in the combined cycle-pulse detonation-turbine engine disclosed in Document 2, the structure is such that the valve, being a problem in Document 1, is removed and continuous output can be obtained for the overall engine. However a plurality of shock tubes must be provided, and hence there is still the problem of complicated overall engine structure.

BRIEF SUMMARY OF THE INVENTION

The present invention takes the above situation into consideration, with an object of providing a detonation engine wherein the overall engine structure can be simplified, and continuous output can be obtained.

In the present invention, the following means are employed in order to solve the above problem.

The detonation engine of the present invention is a detonation engine which creates thrust by generating a detonation wave, comprising: a rotational flow generation device which generates rotational flow about an axis in a mixed gas of air and fuel or a mixed gas of oxygen and fuel; a detonation chamber which is arranged on the downstream side of the rotational flow generation device, formed in a ring-shape radially extended and continuous in the circumferential direction, which continuously combusts the mixed gas in which the rotational flow is generated by the rotational flow generation device, in the circumferential direction to generate detonation waves, and draws it in from the radial inside and exhausts it to the radial outside; and a nozzle which is connected to the detonation chamber, and jets the high temperature and pressure combustion gas generated by the detonation waves flowing from the detonation chamber, to the rear while expanding it, and converts it into thrust.

According to such a detonation engine, the mixed gas of the air and the fuel, or the mixed gas of the oxygen and the fuel, is made into a rotational flow by the rotational flow generation device, and flows into the detonation chamber. Since the detonation chamber is formed in a ring-shape radially extended and continuous in the circumferential direction, if the mixed gas accompanying the rotational flow flowing into the detonation chamber is combusted, the detonation waves travels from the radial inside to the radial outside. On the other hand, combustion of the mixed gas successively spreads toward the front in the rotational direction and is continuously propagated, and as a result combustion is continuously performed in the circumferential direction. The combusted mixed gas becomes high temperature and pressure combustion gas, and then flows successively from the detonation chamber, and is converted into thrust when passing through the nozzle.

Moreover, since the rarefied waves (compression waves; waves with a low pressure) are produced on the radial inside of a circumference of the detonation chamber where combustion has finished, by the inertial force of the combustion gas which goes from the radial inside to the radial outside, a new mixed gas is drawn in, and the mixed gas is continuously filled into the detonation chamber, so that the combustion is again performed by the flame which goes around. As a result, the combustion is continuously performed around the circumferential direction, and the detonation waves are generated continuously and successively.

In the detonation engine of the present invention, an outer casing may be provided radially outside of the rotational flow generation device, the detonation chamber, and the nozzle so as to surround the rotational flow generation device, the detonation chamber, and the nozzle, and a bypass passage may be formed between the rotational flow generation device, the detonation chamber, and the nozzle, and the outer casing.

According to such a detonation engine, since the bypass passage is formed all around the outer circumferential side of the engine, and air (atmosphere) flows inside of this bypass passage, then the flame noise generated in the engine, the driving noise of the drive unit, the exhaust noise of the combustion gas exhausted from the nozzle, and the like are wrapped (covered) with an air layer, so that the engine noise is reduced.

The flying object of the present invention comprises the detonation engine of the present invention.

According to such a flying object, continuous output is always maintained, and hence stable flying conditions are maintained at all times.

According to the detonation engine of the present invention, the overall engine structure can be simplified and continuous output can be maintained.

Moreover, according to the flying object comprising such a detonation engine, continuous output is always maintained, and hence stable flying conditions can be maintained at all times.

DETAILED DESCRIPTION OF THE INVENTION

Hereunder is a description of a first embodiment of a detonation engine according to the present invention with reference to the drawings. However of course the present invention is not to be considered limited to this.

Figure 1:
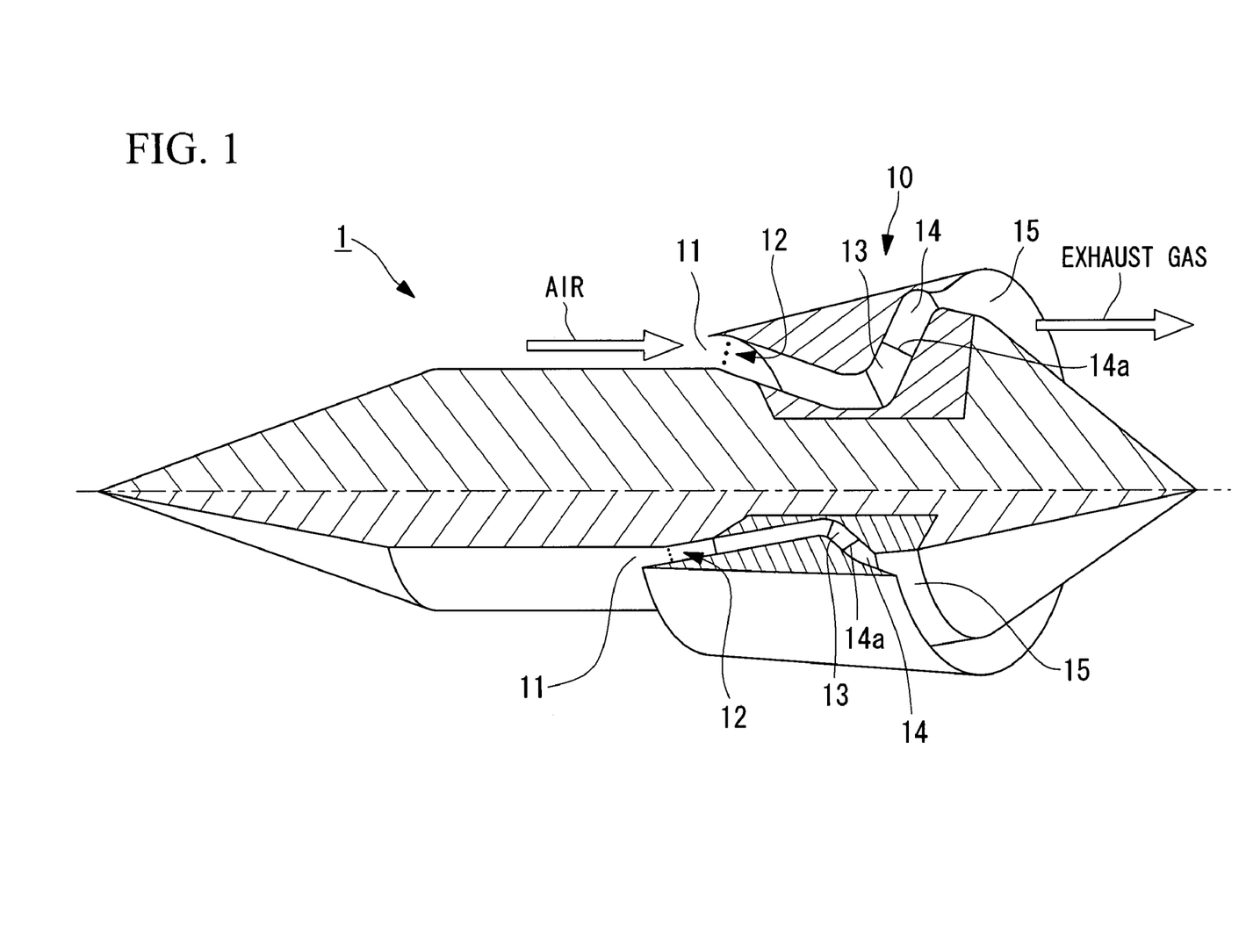
FIG. 1 shows a first embodiment of a detonation engine according to the present invention, being a perspective cross-sectional view showing a flying object comprising the detonation engine.
Figure 2:
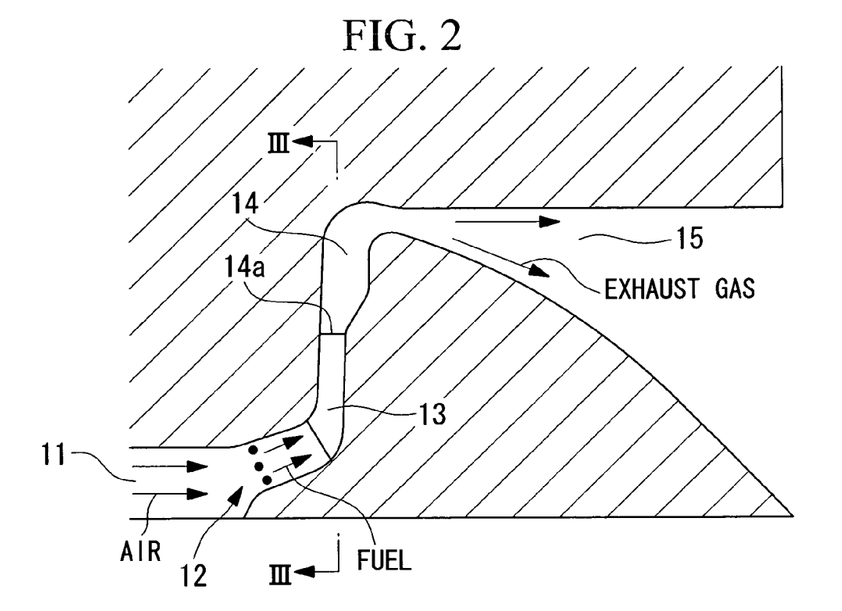
FIG. 2 is a cross-sectional view of the main parts of the detonation engine shown in FIG. 1.
Figure 3:
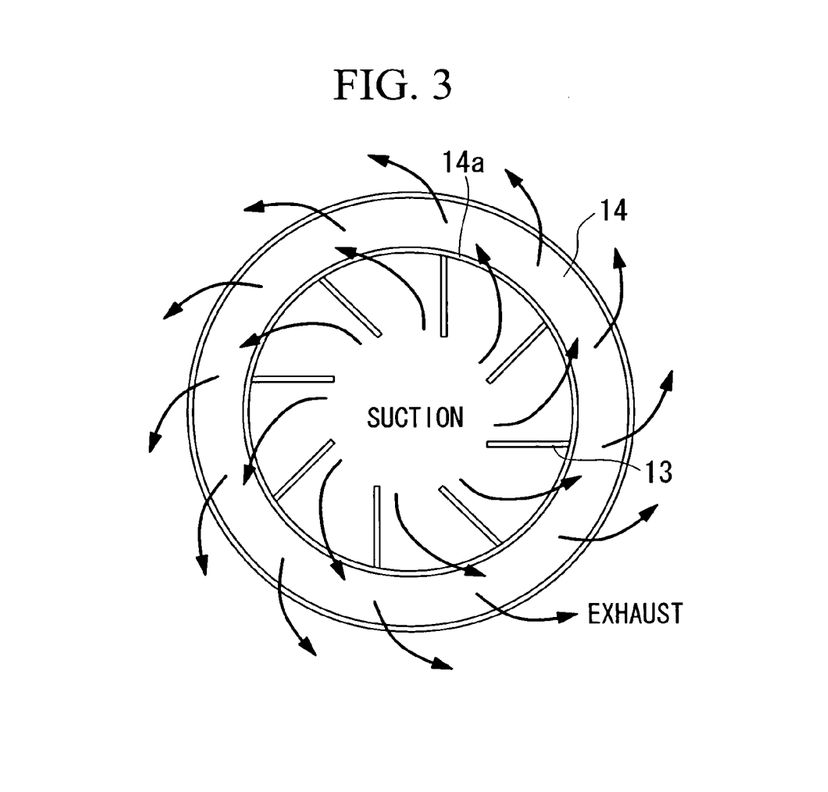
FIG. 3 is a cross-sectional view taken along the line III-III of FIG. 2.

FIG. 1 is a perspective cross-sectional view showing a flying object (for example, missile, rocket, aircraft, or the like) 1 comprising a detonation engine 10 of the present embodiment. FIG. 2 is a cross-sectional view of the main parts of the detonation engine 10 shown in FIG. 1. FIG. 3 is a cross-sectional view taken along the line III-III of FIG. 2.

As shown in FIG. 1 and FIG. 2, the detonation engine 10 according to the present embodiment comprises; an inlet 11, a fuel injection nozzle 12, entrance side guide vanes (rotational flow generation device) 13, a detonation chamber 14, and a nozzle 15, as the main components.

The inlet 11 is an air intake for taking in the combustion air (atmosphere) into the detonation engine 10. This inlet 11 becomes subsonic or supersonic according to the flying conditions. Accordingly, this inlet 11 has a design (shape) which has been customarily applied to exiting turbojet engines, ramjet engines, or the like.

The fuel injection nozzle 12 produces a flammable mixed gas by injecting fuel into the combustion air which has been taken in from the inlet 11, and makes the mixed gas into an optimum mixed state at the very entrance 14a of the detonation chamber 14.

In order to make the mixed gas into the optimum mixed state at the entrance 14a of the detonation chamber 14, the installation site, the nozzle shape, the fuel injection pressure, the direction of injection, and the like, of the fuel injection nozzle 12 must be carefully evaluated during initial testing of the injection system.

The entrance side guide vanes 13 comprise of a plurality of guide vanes which are arranged annularly at equal intervals on the downstream side of the fuel injection nozzle 12 and the upstream side of the detonation chamber 14, and impart to the mixed gas flowing into the detonation chamber 14, a rotating flow (rotational flow) which, as shown in FIG. 3, goes from inside to outside radially and rotates unidirectionally.

The detonation chamber 14 is a doughnut-shaped chamber (or ring-shaped chamber) which is annular in front view with a predetermined depth. In this detonation chamber 14, the abovementioned mixed gas is combusted accompanying the detonation phenomenon, to generate a high temperature and pressure combustion gas.

This high temperature and pressure combustion gas also becomes a rotating flow (rotational flow) which, as shown in FIG. 3, goes from inside to outside radially and rotates unidirectionally, similarly to the mixed gas flowing into the detonation chamber 14 due to the inertial force.

Moreover, the shape of the detonation chamber 14, that is, the inner diameter and the outer diameter of the chamber, the cross-sectional shape of the chamber (shape of the space where the detonation phenomenon occurs), the position of the entrance, and the like, becomes the most important parameter for obtaining a good detonation phenomenon. Accordingly, the shape of the detonation chamber 14 must be carefully studied and examined for each engine model.

The nozzle 15 is a space which is gradually enlarged from the exit of the detonation chamber 14 to the rear (downstream side), so as to create thrust by the expansion of the combustion gas passing therethrough.

The entrance of the nozzle 15, that is, the exit of the detonation chamber 14, is a throat (or a slit) formed continually around the circumferential direction, or a plurality of holes arranged side by side around the circumferential direction (or a plurality of independent nozzles).

Next, here is a description of the basic operating principle of the detonation engine 10 according to the present invention.

As described above, the high temperature and pressure combustion gas combusted accompanying the detonation phenomenon in the detonation chamber 14, becomes a so called detonation wave and is propagated while rotating from inside to outside radially inside the detonation chamber 14.

At this time, a very large centrifugal force is generated by the high temperature and pressure combustion gas which is propagated inside the detonation chamber 14. Therefore, this high temperature and pressure combustion gas is pressed against the wall on the outer circumferential side of the detonation chamber 14, and rarefied waves (compression waves; waves with a low pressure) are generated on the radial inside of the detonation chamber 14 due to the inertial force of the combustion gas which goes from the radial inside to the radial outside. That is, the combustion gas is exhausted from the inside of the detonation chamber 14, and a new mixed gas is refilled into the detonation chamber 14.

In other words, a remarkable pressure gradient and density gradient are formed from the radial inside to the radial outside of the detonation chamber 14.

The formation of this remarkable pressure gradient and density gradient (low pressure-compression wave on the inner circumference side of the detonation chamber 14) enables natural attainment (automatic maintenance (sustenance)) of the flow of the new mixed gas on the low pressure side of the detonation chamber 14 (that is, on the inner circumference side). As a result, the detonation waves continually propagated inside the detonation chamber 14 are generated and maintained (sustained) over the whole time during engine operation, enabling continuous operation of the engine.

On the other hand, thrust is created by the expansion of the combustion gas exhausted from the nozzle 15.

Before the next detonation front appears, there must be sufficient time for the new fresh mixed gas to fill the area through which the previous detonation front has already passed.

That is, the operation frequency (number of times) of the detonation chamber 14 is determined by the speed of the detonation front and the size of the detonation chamber 14.

At the same time, there must be sufficient time for the combustion gas generated by the detonation phenomenon to flow out from the detonation chamber 14.

According to the detonation engine 10 having such a structure, the overall engine structure can be simplified and continuous output can be obtained.

Moreover, according to the flying object 1 comprising such a detonation engine 10, continuous output can be always maintained, and hence stable flying conditions can be maintained at all times.

Figure 4:
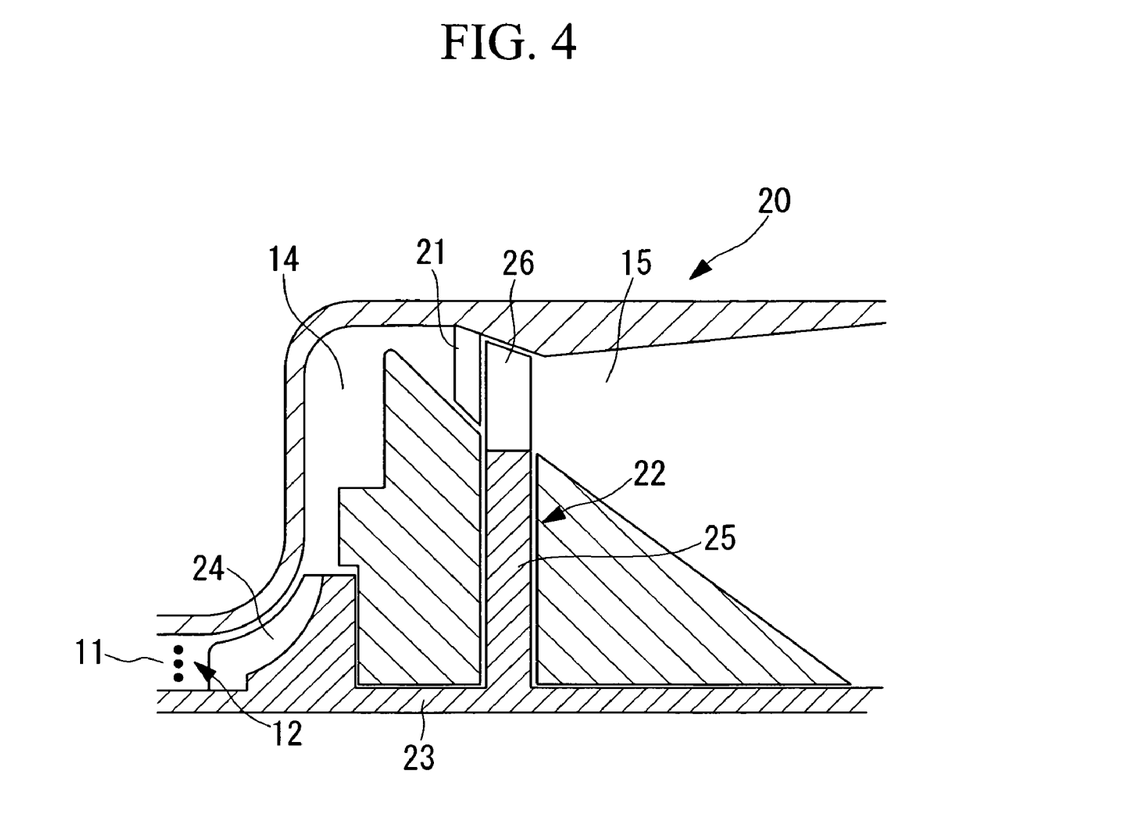
FIG. 4 is a cross-sectional view of the main parts of a second embodiment of the detonation engine according to the present invention.

A second embodiment of the detonation engine according to the present invention is described using FIG. 4.

FIG. 4 is similar to FIG. 2, being a cross-sectional view of the main parts of the detonation engine 20 according to the present embodiment.

As shown in FIG. 4, the detonation engine 20 according to the present embodiment comprises; an inlet 11, a fuel injection nozzle 12, a detonation chamber 14, a nozzle 15, a turbine nozzle 21, and a turbine rotor 22, as the main components.

Since the inlet 11, the fuel injection nozzle 12, the detonation chamber 14, and the nozzle 15 have already been explained for the first embodiment, explanation thereof is omitted here.

The turbine nozzle 21 comprises; a plurality of nozzle guide vanes having an airfoil cross section which are arranged annularly, and has a function to expand and decompress the gas flowing out from the detonation chamber 14, and to change the flow direction of the gas flowing out from itself so that it can impinge on the turbine blades 26 described later at an optimum angle.

The turbine rotor 22 comprises; a shaft 23, an impeller (compressor: rotational flow generation device) 24, a disk 25, and turbine blades 26. The impeller 24 and the disk 25 are directly attached to the shaft 23. The turbine blades 26 are attached to the shaft 24 via the disk 25. Accordingly, the gas flowing out from the turbine nozzle 21 impinges on the turbine blades 26, thereby rotating the shaft 23, the impeller 24, the disk 25, and the turbine blades 26 all together.

The impeller 24 is attached to the shaft 23 at a position on the upstream side (front side; left side in the drawing) from the disk 25, and discharges and compresses gas drawn in from the vicinity of the center of the impeller 24 towards the outer circumferential direction (that is, the direction of the detonation chamber 14) by the centrifugal force due to the high speed rotation of the impeller. As a result, the pressurized mixed gas is supplied to inside of the detonation chamber 14.

Moreover, this impeller 24 plays a similar role to that of the aforementioned entrance side guide vane 13.

According to the detonation engine 20 having such a configuration, since the shaft 23 can be rotated using a starter (electric or pneumatic) applicable to an existing gas turbine engine, the engine can be started more easily and the startability of the engine can be improved.

Moreover, since the mixed gas flowing into the detonation chamber 14 is previously pressurized by the impeller 24, the pressure of the combustion gas after the detonation phenomenon can be increased, and the engine output can be increased.

Other operations and effects are the same as for the first embodiment described above, and hence description thereof is omitted here.

Figure 5:
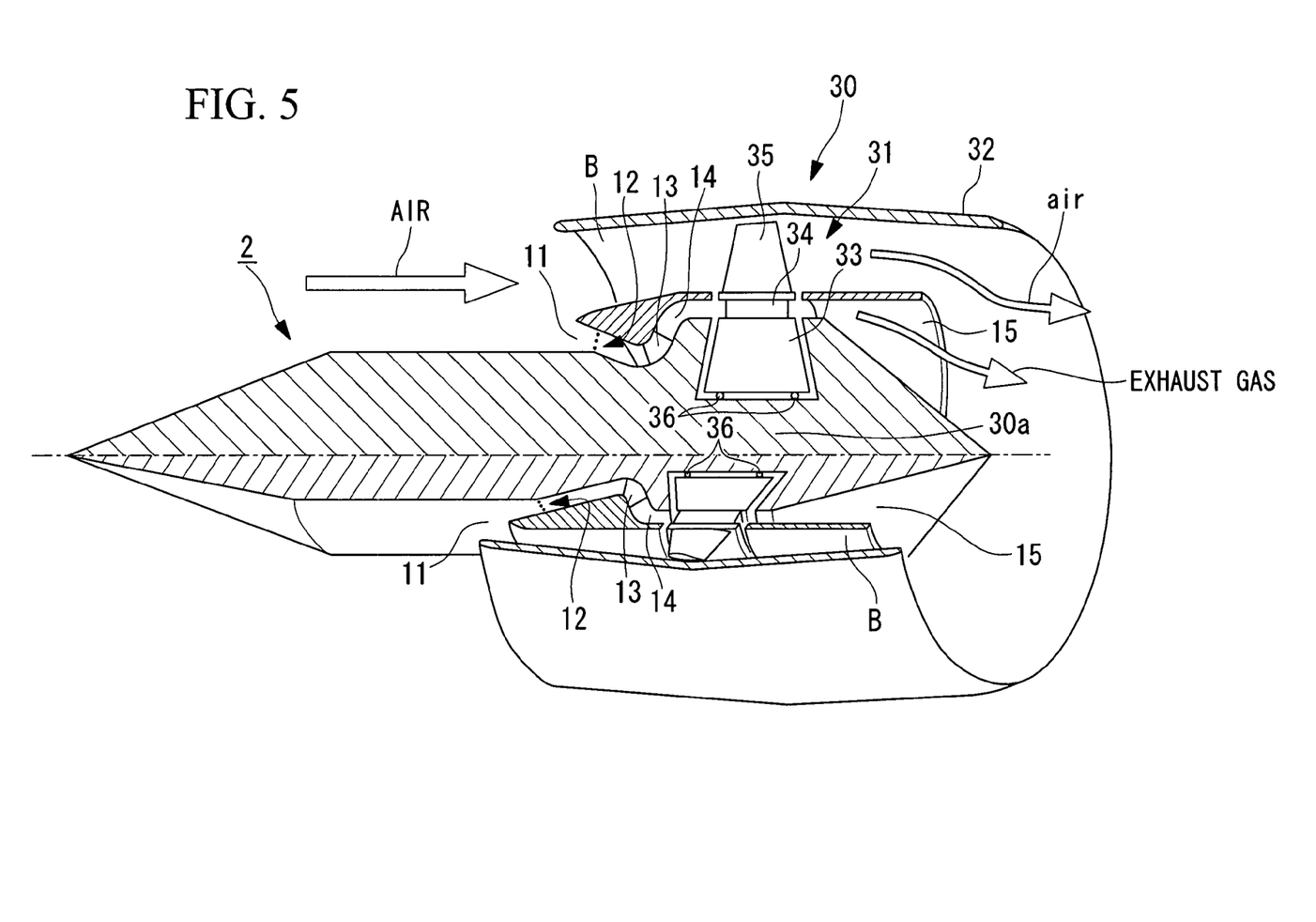
FIG. 5 shows a third embodiment of the detonation engine according to the present invention, being a perspective cross-sectional view showing a flying object comprising the detonation engine.

A third embodiment of the detonation engine according to the present invention is described using FIG. 5.

FIG. 5 is similar to FIG. 1, being a perspective cross-sectional view showing a flying object (for example, missile, rocket, aircraft, or the like) 2 comprising a detonation engine 30 of the present embodiment.

As shown in FIG. 5, the detonation engine 30 according to the present embodiment comprises; an inlet 11, a fuel injection nozzle 12, entrance side guide vanes 13, a detonation chamber 14, a nozzle 15, a turbine rotor 31, and an outer casing 32, as the main components.

Since the inlet 11, the fuel injection nozzle 12, the detonation chamber 14, and the nozzle 15 have already been explained for the first embodiment, explanation thereof is omitted here.

The turbine rotor 31 comprises; a disk 33, turbine blades 34, and a fan 35. The turbine blades 34 are provided radially outside of the disk 33. The fan 35 is provided radially outside of the turbine blades 34. Moreover, the disk 33 is attached to the mainframe 30a of the detonation engine 30 via a bearing 36. Accordingly, the gas flowing out from the detonation chamber 14 impinges on the turbine blades 34, thereby rotating the disk 33, the turbine blades 34, and the fan 35 all together.

The outer casing 32 is a hollow cylindrical casing (cowling) arranged around the outside of the tips (outer circumferential end) of the fan 35, for forming a bypass passage B to make the air (atmosphere) flow to the fan 35 side (that is, to the radial outside of the detonation engine 30).

According to the detonation engine 30 having such a structure, since the bypass passage B is formed around the whole outer circumferential side of the engine, the flame noise generated in the engine, the driving noise of the drive unit, the exhaust noise of the combustion gas exhausted from the nozzle 15, and the like, can be wrapped (covered) with an air layer, so that the engine noise can be reduced.

Moreover, the air passing through inside of the bypass passage B is pressurized by the fan 35, and then jetted to the rear side (opposite side to the travelling direction). Therefore the air flowing out from the bypass passage B becomes a part of the thrust, and the thrust of the engine is increased.

Other operations and effects are the same as for the first embodiment described above, and hence description thereof is omitted here.

Figure 6:
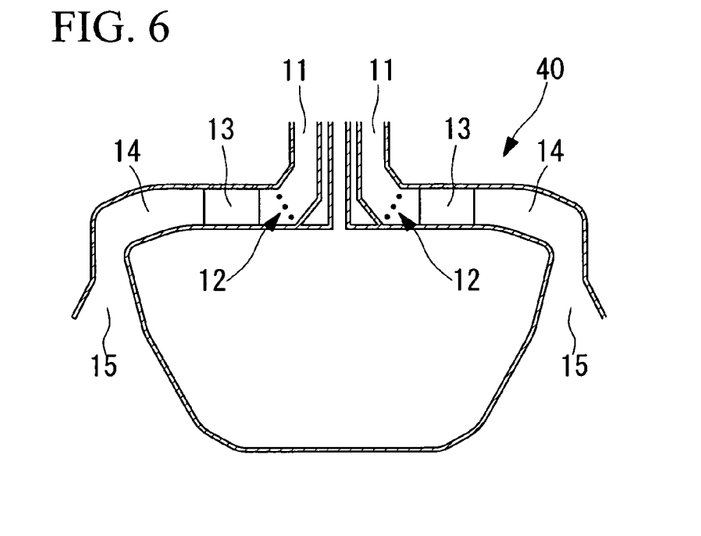
FIG. 6 is a cross-sectional view of the main parts of a fourth embodiment of the detonation engine according to the present invention.

A fourth embodiment of the detonation engine according to the present invention is described using FIG. 6.

The detonation engine 40 in the present embodiment has a similar structure to that of the abovementioned first embodiment. However it is different from the first embodiment in that oxygen is supplied via the inlet 11 and a fuel such as hydrogen or the like is supplied via the fuel injection nozzle 12, so that it can be used in space where there is no oxygen (for example, outer space of the exoatmosphere) or so that it can be applied to a flying object requiring a particularly high flying speed for a flying object.

According to the detonation engine 40 having such a structure, since air (atmosphere) is not required for combustion, it can be used even in space where there is no oxygen.

Other operations and effects are the same as for the first embodiment described above, and hence description thereof is omitted here.

Figure 7:
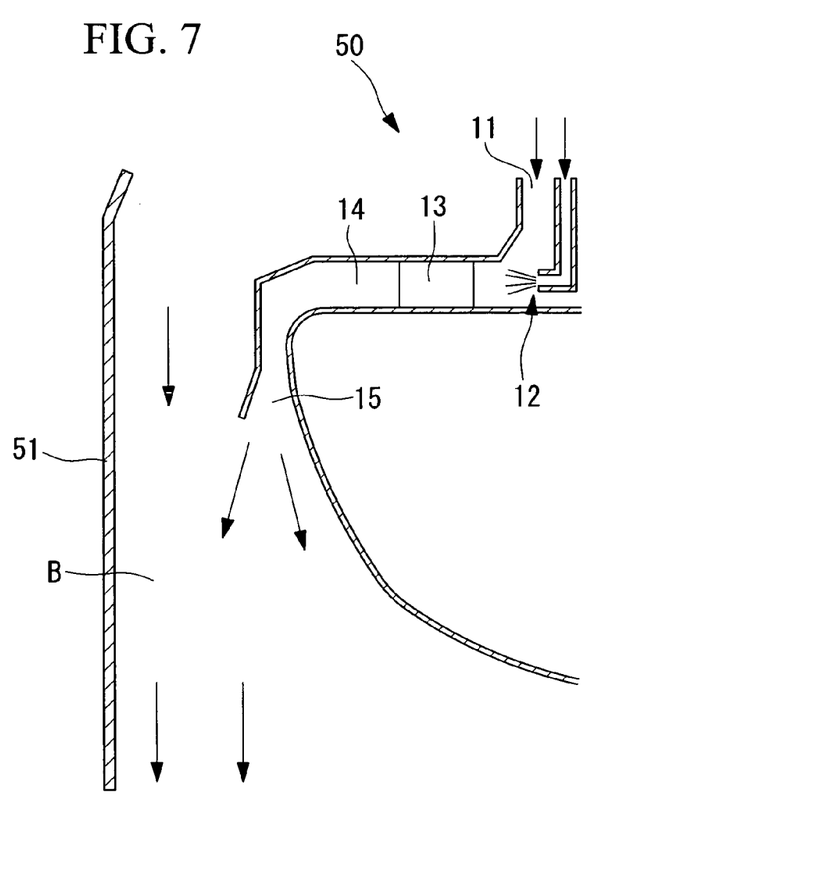
FIG. 7 is a cross-sectional view of the main parts of a fifth embodiment of the detonation engine according to the present invention.

A fifth embodiment of the detonation engine according to the present invention is described using FIG. 7.

The detonation engine 50 in the present embodiment has a similar structure to that of the abovementioned fourth embodiment. However it is different from the fourth embodiment in that an outer casing 51 is provided so as to form a bypass passage B around the whole outer circumferential side of the engine.

Other operations and effects are the same as for the fourth embodiment described above, and hence description thereof is omitted here.

The outer casing 51 has a similar structure to that of the outer casing 32 described for the third embodiment, and the bypass passage B for flowing the air (atmosphere) is formed on the inside.

According to the detonation engine 50 having such an structure, since the bypass passage B is formed around the whole outer circumferential side of the engine, the flame noise generated in the engine, the driving noise of the drive unit, the exhaust noise of the combustion gas exhausted from the nozzle 15, and the like, can be wrapped (covered) with an air layer, so that the engine noise can be reduced.

Moreover, the air passing through the inside of the bypass passage B is drawn out to the downstream side (rear side; bottom in the drawing) due to the ejector effect of the combustion gas jetted out from the nozzle 15, and the amount of air passing through the inside of the bypass passage B is increased. Therefore the engine noise can be further reduced.

In the detonation engine described above, it is more preferable if the structure is such that the wall of the detonation chamber 14 which can have an extremely high temperature due to the detonation, can be cooled down using the air (atmosphere) before being mixed, or oxygen, or fuel, or the like.

Accordingly, the wall of the detonation chamber 14 can be protected against the heat of the combustion gas, and the air (atmosphere), oxygen, fuel, or the like is moderately heated before being mixed, so that the detonation can be started more easily, and the detonation can be maintained (continued) more suitably.

Moreover, the detonation engine according to the present invention can be applied not only to the flying object mentioned above, but can also be used for example, as an auxiliary power unit such as a motor for power generation, or for an aircraft, and the like.

Furthermore, in the abovementioned embodiments, the drawings suggest that the flying object and the detonation engine are integrally constructed. However the present invention is not limited to such a construction, and the detonation engine can be constructed separately from the flying object, and the separately constructed detonation engine can then be attached to the flying object.

What is claimed is:

1. A detonation engine comprising: a plurality of guide vanes which generate a circumferential rotational flow in a mixed gas of air and fuel or a mixed gas of oxygen and fuel about a centerline axis; at least one fuel injector arranged upstream of said guide vanes, with respect to the flow of the mixed gas; a detonation chamber which is arranged on a downstream and radially outward side of said guide vanes, formed in a ring-shape that is radially extended and continuous in a circumferential direction, in which detonation waves and a combustion gas at a high temperature and under a high pressure that continuously flow in an outward radial direction, with respect to the centerline axis through the detonation chamber, are generated by combusting the mixed gas in which the circumferential rotational flow is generated by said plurality of guide vanes; and a nozzle connected to said detonation chamber that discharges the detonation waves to the rear, expands the combustion gas, and converts the combustion gas into thrust, the combustion gas flowing continuously to the rear while rotating.

2. A detonation engine according to claim 1, further comprising:

an outer casing located radially outside of said plurality of guide vanes, said detonation chamber, and said nozzle with a space therebetween so as to surround said guide vanes, said detonation chamber, and said nozzle, wherein a bypass passage is formed by the space between said outer casing and said plurality of guide vanes, said detonation chamber, and said nozzle.

3. A flying object comprising the detonation engine according to claim 1.

4. A detonation engine comprising: an impeller which generates a circumferential rotational flow in a mixed gas of air and fuel or a mixed gas of oxygen and fuel about a centerline axis; at least one fuel injector arranged upstream of said impeller, with respect to the flow of the mixed gas; a detonation chamber which is arranged on a downstream and radially outward side of said impeller, formed in a ring-shape that is radially extended and continuous in a circumferential direction, in which detonation waves and a combustion gas at a high temperature and under a high pressure that continuously flow in an outward radial direction, with respect to the centerline axis through the detonation chamber, are generated by combusting the mixed gas in which the circumferential rotational flow is generated by said impeller, the combustion gas flowing continuously to the rear while rotating; a turbine rotor having a shaft, a disk, an impeller, and a plurality of turbine blades, said turbine blades attached to said shaft via said disk; and a turbine nozzle comprising a plurality of nozzle guide vanes having an airfoil cross section which are arranged annularly, so as to expand and decompress the gas flowing out from said detonation chamber, and cause the gas flowing out from said turbine nozzle to impinge on said turbine blades at an appropriate angle wherein said turbine blades, said shaft, said impeller and said disk rotate together as one.

5. A flying object comprising a detonation engine, said detonation engine comprising: a plurality of guide vanes which generate a circumferential rotational flow in a mixed gas of air and fuel or a mixed gas of oxygen and fuel about a centerline axis; at least one fuel injector arranged upstream of said guide vanes, with respect to the flow of the mixed gas; a detonation chamber which is arranged on a downstream and radially outward side of said plurality of guide vanes, formed in a ring-shape that is radially extended and continuous in a circumferential direction, in which detonation waves and a combustion gas at a high temperature and a high pressure that continuously flow in an outward radial direction, with respect to the centerline axis through the detonation chamber, are generated by combusting the mixed gas in which the circumferential rotational flow is generated by said plurality of guide vanes; a turbine rotor comprising: a disk attached via a bearing so as to cover a main body of said detonation engine; a plurality of turbine blades located on said disk, said turbine blades being rotated by impingement of gas flowing out from said detonation chamber; and a fan located on said turbine blades; a nozzle arranged on a downstream side of said turbine rotor that discharges the detonation waves to the rear, expands the combustion gas, and converts the combustion gas into thrust, the combustion gas flowing continuously to the rear while rotating; and an outer casing located radially outside of said guide vanes, said detonation chamber, and said nozzle with a space therebetween so as to surround said guide vanes, said detonation chamber, and said nozzle, wherein a bypass passage is formed by the space between said outer casing and said guide vanes, said detonation chamber, and said nozzle.

* * * * *